US011877349B2

(12) United States Patent
Cai et al.

(10) Patent No.: US 11,877,349 B2
(45) Date of Patent: Jan. 16, 2024

(54) SLICES FOR APPLICATIONS BASED ON MULTIPLE ACTIVE SIM PROFILES

(71) Applicant: T-Mobile Innovations LLC, Overland Park, KS (US)

(72) Inventors: Zheng Cai, Fairfax, VA (US); Zheng Fang, McLean, VA (US); Yu Wang, Fairfax, VA (US); David Z. Sun, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 269 days.

(21) Appl. No.: 17/362,458

(22) Filed: Jun. 29, 2021

(65) Prior Publication Data

US 2022/0417729 A1 Dec. 29, 2022

(51) Int. Cl.
*H04W 4/00* (2018.01)
*H04W 8/20* (2009.01)
*H04W 36/08* (2009.01)
*H04W 36/32* (2009.01)
*H04W 48/18* (2009.01)

(52) U.S. Cl.
CPC ........... *H04W 8/205* (2013.01); *H04W 36/08* (2013.01); *H04W 36/32* (2013.01); *H04W 48/18* (2013.01)

(58) Field of Classification Search
CPC ..... H04W 8/205; H04W 36/08; H04W 36/32; H04W 48/18; H04W 8/183; H04W 36/28; H04W 88/06; H04W 76/15; Y02D 30/70
USPC ........................................................ 370/329
See application file for complete search history.

(56) References Cited

U.S. PATENT DOCUMENTS

| 9,100,810 B2 | 8/2015 | Schell et al. |
| 9,414,220 B2 | 8/2016 | Lee et al. |
| 10,182,338 B2 * | 1/2019 | Li ............................ H04W 4/60 |
| 10,237,722 B2 * | 3/2019 | Chen ...................... H04W 12/35 |
| 10,237,723 B2 * | 3/2019 | Borse ................... H04B 1/3816 |
| 10,524,177 B2 | 12/2019 | Miao et al. |

(Continued)

FOREIGN PATENT DOCUMENTS

WO 2018141148 A1 8/2018

OTHER PUBLICATIONS

Ericsson; "Reasons and methods for serving slices on different frequencies"; 3GPP TSG-RAN WG3 #109e; Aug. 2020; pp. 1-9; Tdoc R3-205031; 3GPP; Sophia Antipolis, France.

*Primary Examiner* — Amancio Gonzalez

(57) ABSTRACT

User circuitry within a wireless User Equipment ("UE") that may utilize multiple subscriber identity module ("SIM") profiles activates two or more SIM profiles to be active simultaneously. The user circuitry transfers service requests for wireless data services using the SIM profiles to network circuitry. The wireless data services may have different slice service types over different operating frequency bands of different target cells. The network circuitry wirelessly exchanges data with wireless access nodes associated with the target cells over the operating frequency bands to establish packet data unit sessions comprising the slice service types using the respective SIM profiles such that multiple packet data unit sessions are active using multiple SIM profiles simultaneously. Various applications may be mapped to the appropriate SIM profile and packet data unit session based on the respective provisioned slice characteristics matching the respective application requirements.

20 Claims, 6 Drawing Sheets

(56) References Cited

U.S. PATENT DOCUMENTS

| | | | |
|---|---|---|---|
| 10,582,412 B2* | 3/2020 | Link, II | H04M 15/851 |
| 10,708,761 B1* | 7/2020 | Yin | H04W 8/205 |
| 11,039,335 B2* | 6/2021 | Link, II | H04M 15/852 |
| 11,272,336 B2* | 3/2022 | Hadadi | H04W 4/50 |
| 11,277,738 B2* | 3/2022 | Namiranian | H04W 12/0431 |
| 2013/0225123 A1* | 8/2013 | Adjakple | G06Q 20/06 |
| | | | 455/406 |
| 2016/0269891 A1* | 9/2016 | Chen | H04W 76/18 |
| 2017/0164184 A1* | 6/2017 | Borse | H04B 1/3816 |
| 2017/0164212 A1 | 6/2017 | Opsenica et al. | |
| 2017/0332421 A1 | 11/2017 | Sternberg et al. | |
| 2019/0274015 A1* | 9/2019 | Surnilla | H04W 76/30 |
| 2020/0137555 A1* | 4/2020 | Dos Santos | H04W 8/18 |
| 2020/0154305 A1* | 5/2020 | Link, II | H04M 15/83 |
| 2020/0367053 A1 | 11/2020 | Yang | |
| 2021/0037455 A1 | 2/2021 | Zhu et al. | |
| 2021/0360719 A1* | 11/2021 | Kwan | H04W 8/183 |
| 2021/0410107 A1* | 12/2021 | Park | H04W 76/27 |
| 2022/0248279 A1* | 8/2022 | Thantharate | H04W 76/11 |
| 2022/0394443 A1* | 12/2022 | Li | H04W 4/60 |
| 2022/0394605 A1* | 12/2022 | Wang | H04W 48/18 |
| 2023/0026417 A1* | 1/2023 | Thantharate | H04W 8/24 |

\* cited by examiner

SLICES FOR APPLICATIONS BASED ON MULTIPLE ACTIVE SIM PROFILES

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have wireless access nodes (e.g., base stations such as eNode B, gNode B) which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

Each wireless access node serves one or more cells that are each operating at a selected radio frequency band (i.e., operating frequency band ("OFB")). The wireless user devices request access/authorization to the wireless network based on an active Subscriber Identity Module ("SIM") profile and its associated allowances on the network based on the subscriber's carrier, selected package and features, payment history, and so forth. The wireless devices, after authentication, request sessions for communicating with external data networks through the wireless access nodes via a cell based on the user application that is to use the session for communication to external data networks. Certain radio frequency bands offer different advantages and disadvantages including latency, noise, connection throughput, spectrum efficiency, and the like. The applications using the session may have varying requirements associated with the radio frequency band such as, for example, low latency, high connection throughput, and the like. Network slicing provides a flexible logical network architecture. Slicing service types include, for example, enhanced Mobile Broadband (eMBB), Ultra Reliable Low Latency Communications (URLLC), and massive Machine Type Communications (mMTC). Each of the slice service types operate best on various OFBs. For example, eMBB is best suited to high frequency bands, where mMTC is best suited to low frequency bands. However, a wireless user device can only be connected to a single cell on a single OFB at a time based on the active SIM. Accordingly, all allocated slices for the wireless user device operate over the same OFB, which may not provide the best service for the given slice and the corresponding application requirements.

Technical Overview

User circuitry within a wireless User Equipment ("UE") that may utilize multiple subscriber identity module ("SIM") profiles activates two or more SIM profiles to be active simultaneously. The user circuitry transfers service requests for wireless data services using the SIM profiles to network circuitry. The wireless data services may have different slice service types over different operating frequency bands of different target cells. The network circuitry wirelessly exchanges data with wireless access nodes associated with the target cells over the operating frequency bands to establish packet data unit sessions comprising the slice service types using the respective SIM profiles such that multiple packet data unit sessions are active using multiple SIM profiles simultaneously. Various applications may be mapped to the appropriate SIM profile and packet data unit session based on the respective provisioned slice characteristics matching the respective application requirements.

DETAILED DESCRIPTION

Figure 1:
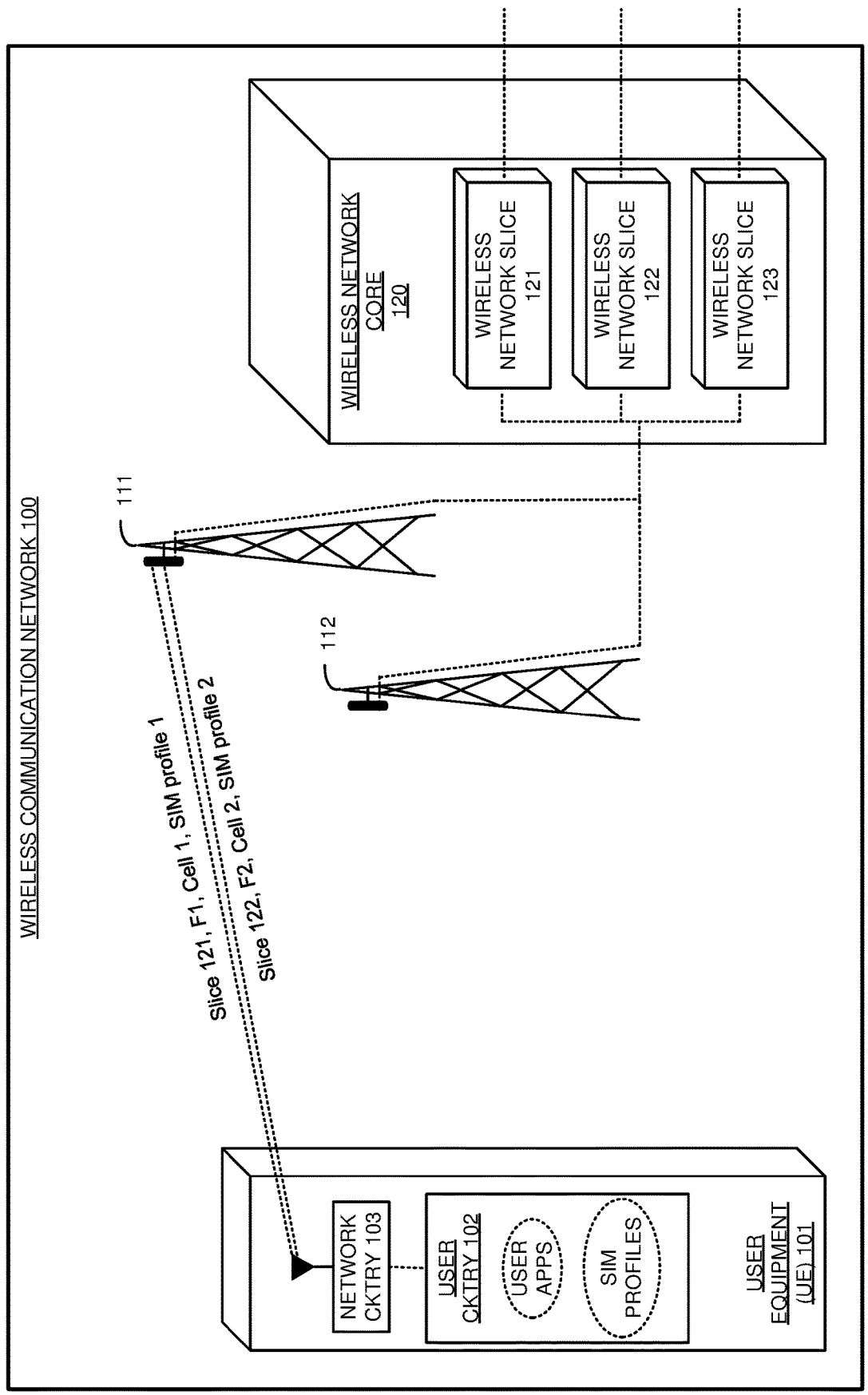
FIG. 1 illustrates a wireless communication network that serves a wireless User Equipment (UE) that has multiple active SIM profiles.

FIG. 1 illustrates wireless communication network 100 that serves wireless User Equipment (UE) 101. Wireless communication network 100 comprises wireless UE 101, wireless access nodes 111 and 112, and network core 120, which includes wireless network slices 121-123. UE 101 comprises user circuitry (CKTRY) 102 and network circuitry 103. User circuitry 102 comprises user applications (APPS) like augmented-reality, vehicle-control, atmospheric sensing, or some other user service. User circuitry 102 further comprises Subscriber Identity Module ("SIM") profiles (SIM PROFILES). The SIM profiles may include one or more physical standalone SIMs stored on a Universal Integrated Circuit Card ("UICC") and/or one or more embedded SIM ("eSIM") stored on an embedded UICC ("eUICC"). Wireless network slices 121-123 may comprise Ultra Reliable Low Latency Communication (URLLC) slices, enhanced Mobile Broadband (eMBB) slices, massive Machine Type Communication (mMTC) slices, default slices, backup slices, and/or some other type of network slices. The number of UEs, wireless access nodes, and wireless network slices that are depicted on FIG. 1 has been restricted for clarity, and wireless communication network 100 may comprise many more UEs, nodes, and slices.

Various examples of network operation and configuration are described herein. In some examples, upon startup of UE 101, user circuitry 102 activates more than one SIM PROFILE. In some embodiments, network circuitry 103 exchanges data with wireless network core 120 via wireless access node 111 to authenticate UE 101 on the network using one or more SIM PROFILES. For example, the network circuitry 103 may authenticate the UE 101 with a first SIM PROFILE (e.g., SIM profile 1) and the user circuitry 102 may share the authentication with the other SIM PROFILES (e.g., SIM profile 2). As another example, the network circuitry 103 may authenticate the UE 101 with each active SIM PROFILE. During the wireless network exchange, wireless network core 120 may approve one or more network slices 121-123 for each active SIM PROFILE, and each SIM PROFILE may utilize a preferred network slice 121-123 based on a preferred slice service type for the SIM PROFILE. The network circuitry 103 may then select a cell with a preferred operating frequency band for each SIM PROFILE connection such that the SIM PROFILE utilizes a cell with an operating frequency band that corresponds to the preferred slice service type for the SIM PROFILE. For example, a SIM PROFILE that has a preferred slice service type of eMBB may use a very high frequency band where a SIM PROFILE that has a preferred slice service type of mMTC may use a lower frequency band. While a single antenna is depicted in UE 101, multiple antennas may be used to communicate with different cells of the wireless access nodes 111 and 112 simultaneously. The UE 101 is then camped on a cell with a given frequency for each SIM PROFILE, such that the UE 101 is camped on multiple cells at multiple frequencies, each using a different slice for each SIM PROFILE. In some examples, user circuitry 102 executes a user application and identifies an association between the user application and the SIM PROFILE or the slice service type. For example, the user application may include information that maps the user application to a SIM PROFILE or to a slice service type. The user circuitry 102 transfers a service request for a corresponding wireless data service having the slice service type to network circuitry 103. Network circuitry 103 may wirelessly exchange signaling with wireless access node 111 over a frequency band (F1) to select wireless network slice 121 having the slice service type identified based on the user application. Wireless access node 111 and wireless network slice 121 exchange the data to establish a packet data unit session for the user application using the network slice 121.

As shown in FIG. 1, after performing the startup of the UE 101 discussed above, the wireless UE 101 is camped on cell 1 using OFB 1 of wireless access node 111 using SIM profile 1 and slice 121. The wireless UE 101 is also camped on cell 2 using OFB 2 of wireless access node 111 using SIM profile 2 and slice 122. Any user applications that are launched on UE 101 may then be mapped to the appropriate communication connection with the appropriate slice and OFB based on mappings within the user application to the SIM PROFILE or the slice type, for example.

Advantageously, UE 101 efficiently obtains the appropriate wireless network slices 121-123 over the appropriate or preferred OFB using multiple SIM profiles simultaneously such that applications are able to be mapped to a connection to obtain the best fit to service requirements of the application which may limit service impact from frequent handover or service impact from using a frequency and slice that is not appropriate for the application because it is the only one available. In previous systems, a UE has only one connection on an OFB that all applications must use. Using multiple active SIM PROFILES allows the UE 101 to map applications to the most appropriate OFB and slice for the application when the application starts. Further, handovers of the UE 101 may be performed on a per-connection basis, such that a first SIM profile may not be handed over to a different cell at the same time as a second SIM profile, which has different service needs and quality of service at any given time because of different OFBs.

UE 101 and wireless access nodes 111 and 112 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access nodes 111 and 112 and wireless network slices 121-123 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols. While FIG. 1 depicts two wireless access nodes 111 and 112, any number of wireless access nodes 111 and 112 may be included in wireless communication network 100. The depiction of two wireless access nodes is limited for clarity. Similarly, three network slices 121-123 are depicted in FIG. 1 for clarity, and any number of wireless network slices 121-123 may be included in wireless communication network 100.

UE 101 comprises a vehicle, sensor, robot, computer, phone, or some other data appliance with wireless communication circuitry including network circuitry 103. Wireless access nodes 111 and 112 are depicted as towers but wireless access nodes 111 and 112 may use other mounting structures or no mounting structure at all. Wireless access nodes 111 and 112 may comprise gNodeBs, eNodeBs, NB-IoT access nodes, LP-WAN base stations, wireless relays, and/or some other wireless network transceivers. UE 101 and wireless access nodes 111 and 112 comprise antennas, amplifiers, filters, modulation, and analog/digital interfaces. UE 101, wireless access nodes 111 and 112, and wireless network slices 121-123 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. In some examples, wireless network slices 121-123 comprise User Plane Functions (UPFs), Gateways (GWs), and/or other network elements that are hosted by a Network Function Virtualization Infrastructure (NFVI).

Figure 2:
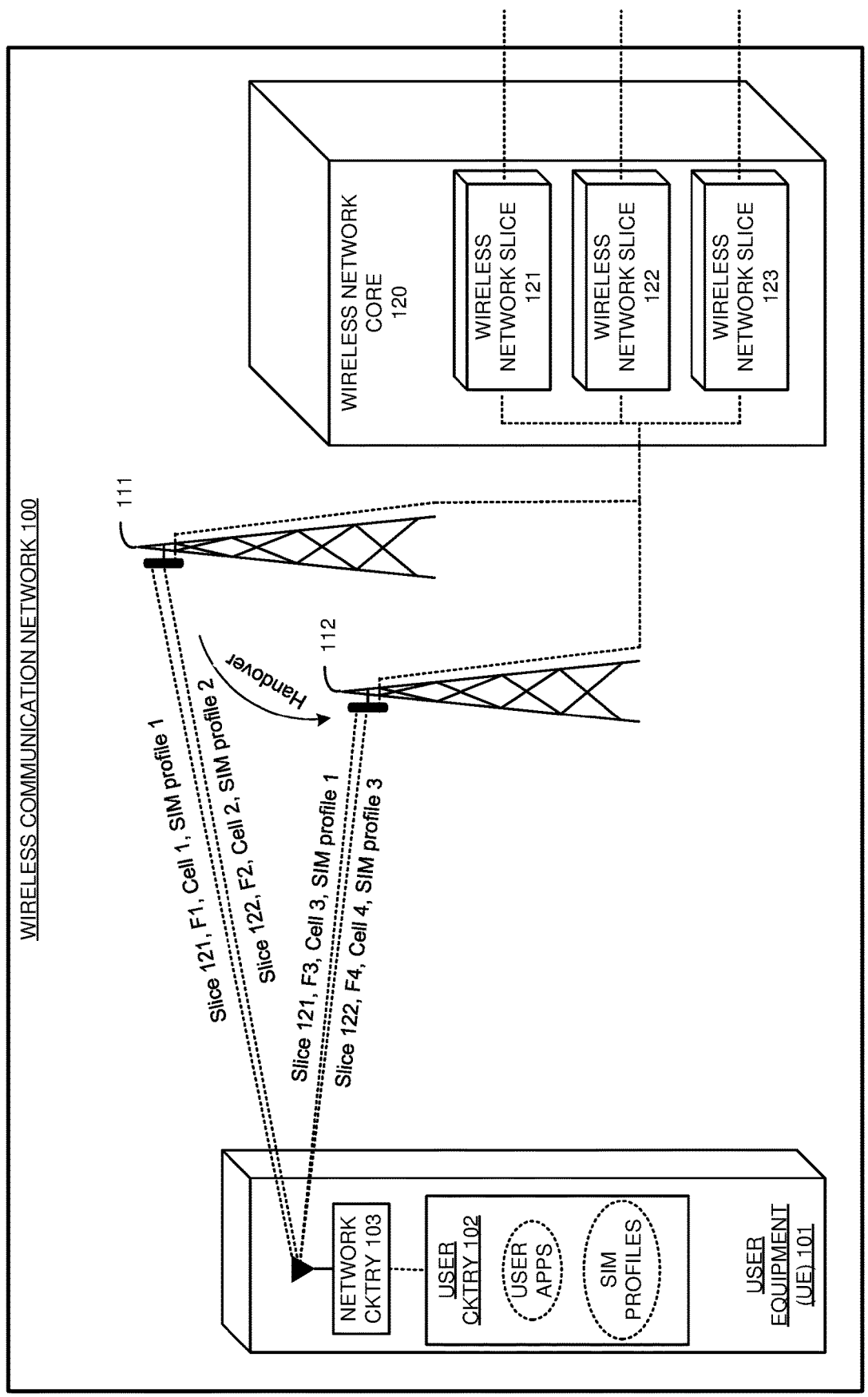
FIG. 2 a wireless communication network that serves a wireless User Equipment (UE) that has multiple active SIM profiles that may be subject to handovers.

FIG. 2 illustrates wireless communication network 100 after a handover has occurred. Multiple types of handovers may be possible, and each connection may be handed over independently of other connections. A first type of handover may be a standard handover of the connection, as shown with the handover of SIM profile 1 communication. A second type of handover may be a handover of the user applications using a SIM PROFILE to a second SIM PROFILE connected to a different cell, as shown with the handover of the applications using SIM profile 2 to SIM profile 3.

A handover may occur, for example, when a quality of service ("QOS") or other metric for a connection falls below a threshold. For example, when a UE 101 mobility status changes (e.g., UE 101 begins moving), a handover may be needed. However, differing connections of the UE 101 may have differing requirements to handover each of the connections.

The SIM profile 1 is using a connection to cell 1 using OFB 1 on wireless access node 111 and slice 121. One or more user applications may be using the connection, and a handover may be required because the connection metrics may fall below a threshold. The network circuitry 103 may perform a cell reselection. The network circuitry 103 performs the cell reselection by exchanging data with the wireless access node 112 that is operating over the OFB 3. Once the network circuitry 103 performs the cell reselection, the network circuitry 103 requests the PDU session with the wireless network slice 121. Once the PDU session is established, the network circuitry 103 exchanges data with the user circuitry 102 and with the wireless access node 112 to provide the wireless service for the user applications using the SIM profile 1 on the wireless UE 101.

SIM profile 2 is using a connection to cell 2 using OFB 2 on wireless access node 111 and slice 122. One or more user applications may be using the connection, and a handover may be required because the connection metrics may fall below a threshold. Another SIM profile 3 may have a connection with wireless access node 112 on cell 4 and OFB 4 using slice 122. The user applications using SIM profile 2 may be handed over to SIM profile 3 to use the connection established for SIM profile 3. PDU sessions may be established for the user applications using slice 122 and SIM profile 3 on cell 4 using OFB 4 on wireless access node 112.

Figure 3:
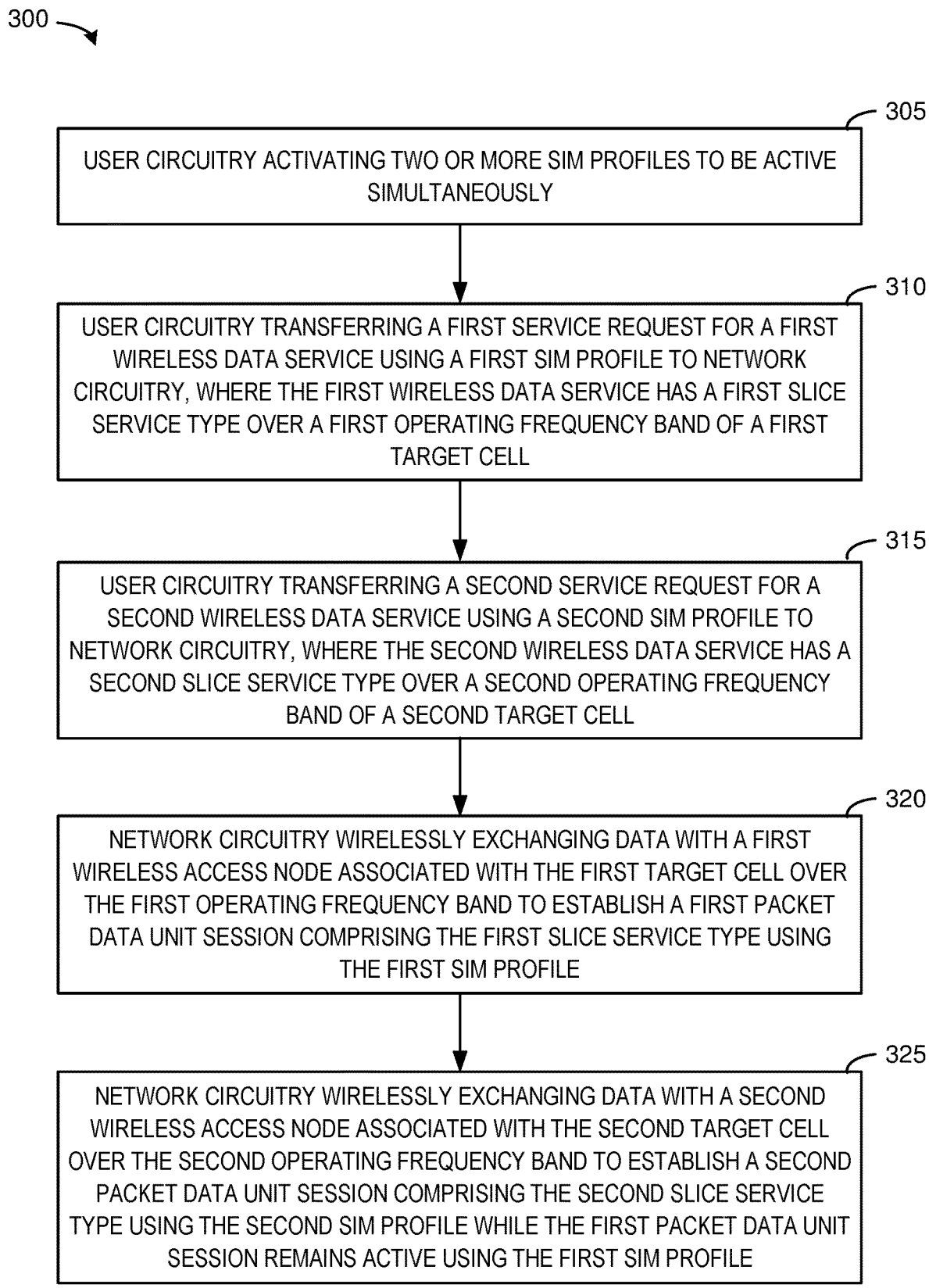
FIG. 3 illustrates the operation of the wireless communication network and the wireless UE to activate and utilize multiple SIM profiles on the wireless UE.

FIG. 3 illustrates the operation 300 of wireless communication network 100 and wireless UE 101 to utilize multiple SIM profiles simultaneously. The operation is exemplary and may vary in other examples. In UE 101, user circuitry 102 activates two or more SIM profiles to be active simultaneously (305). The user circuitry 102 transfers a first service request for a first wireless data service using a first SIM profile to network circuitry 103 (310). The wireless data service requested has a first slice service type over a first operating frequency band of a first target cell. The user circuitry 102 transfers a second service request for a second wireless data service using a second SIM profile to network circuitry 103 (315). The second wireless data service requested has a second slice service type over a second operating frequency band of a second target cell. The network circuitry 103 wirelessly exchanges data with a first wireless access node (111, 112) associated with the first target cell over the first operating frequency band to establish a first packet data unit session including the first slice service type using the first SIM profile (320). The network circuitry 103 wirelessly exchanges data with a second wireless access node (111, 112) associated with the second target cell over the second operating frequency band to establish a second packet data unit session including the second slice service type using the second SIM profile (325). The first packet data unit session remains active using the first SIM profile while the second packet data unit session is established and is active.

Additional steps may be included in operation 300. For example, the network circuitry 103 wirelessly exchanges data with the respective wireless access node (111, 112) over the respective operating frequency band on the respective target cell for each SIM profile for the associated user applications. For example, network circuitry 103 wirelessly exchanges data with the first wireless access node over the first operating frequency band using the first packet data unit session and associated slice service type for a first user application associated with the first SIM profile and simultaneously wirelessly exchanges data with the second wireless access node over the second operating frequency band using the second packet data unit session and associated second slice service type for a second user application associated with the second SIM profile. In some embodiments, the user circuitry 102 launches the first application and maps the first application to use the first packet data unit session based on an association between the first application and the first slice service type and launches the second application and maps the second application to use the second packet data unit session based on an association between the second application and the second slice service type. In some embodiments, the user circuitry 102 launches the first application and maps the first application to use the first packet data unit session based on an association between the first application and the first operating frequency band and launches the second application and maps the second application to use the second packet data unit session based on an association between the second application and the second operating frequency band. In some embodiments, the user circuitry 102 launches the first application and maps the first application to use the first packet data unit session based on an association between the first application and the first SIM profile and launches the second application and maps the second application to use the second packet data unit session based on an association between the second application and the second SIM profile. In some embodiments, the user circuitry 102 transfers a third service request for a third wireless data service using a third SIM profile to the network circuitry 103, the third wireless data service having the first slice service type over a third operating frequency band of a third target cell. The network circuitry 103 wirelessly exchanges data with a third wireless access node (111, 112) associated with the third target cell over the third operating frequency band to establish a third packet data unit session including the first slice service type using the third SIM profile. The user circuitry 102 hands over the first application from the first SIM profile to the third SIM profile, and the network circuitry 103 wirelessly exchanges data of the first application with the third wireless access node. The handover may be in response to data latency, data reliability, or data throughput falling below a target threshold on the first target cell or in response to a change in the mobility of the wireless UE 101. The network circuitry 103 may complete a cell reselection from the first target cell to a third target cell using the first SIM profile while the second packet data unit session using the second SIM profile remain on the second target cell. In some embodiments, the first operating frequency band is selected based on the first slice service type and the second operating frequency band is selected based on the second slice service type. The first slice service type may be a preferred slice service type defined in the first SIM profile, and the second slice service type may be a preferred slice service type defined in the second SIM profile. The slice service types may be, for example, eMBB, URLLC, or mMTC.

Figure 4:
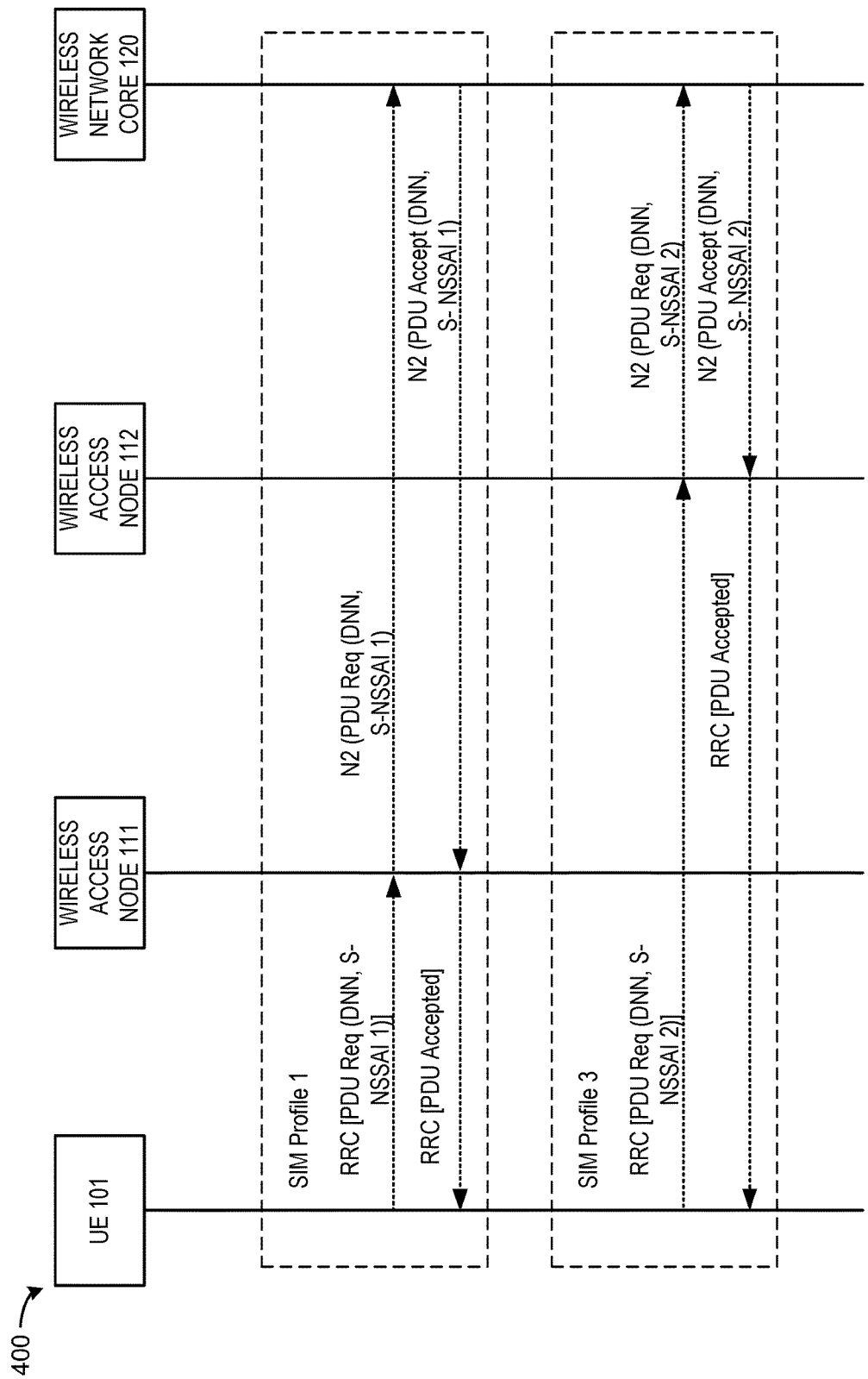
FIG. 4 illustrates a swim diagram of communication on the wireless communication network to activate and utilize multiple SIM profiles on the wireless UE.

FIG. 4 illustrates a swim diagram 400 of communication on the wireless communication network to simultaneously use multiple SIM profiles and obtain network slices using the desired slice service types and operating frequency bands for user applications when camped on multiple cells operating over the operating frequency bands. The operation is exemplary and may vary in other examples. In this example, wireless network slice 121 comprises the selected slice service type for SIM profile 1 and wireless network slice 122 comprises the selected slice service type for SIM profile 2. In this example, UE 101 activates SIM profile 1 and SIM profile 2 simultaneously. Subsequently, wireless UE 101 executes, for example, an augmented-reality application that requires a low-latency service associated with SIM profile 1 and a social media application that requires a mobile broadband service associated with SIM profile 2. Accordingly, in this example, the slice service type for network slice 121 may be URLLC and the slice service type for network slice 122 may be eMBB.

The UE 101 is camped on a cell served by wireless access node 111 for SIM profile 1 and on a cell served by wireless access node 112 for SIM profile 2. The wireless access node 111 periodically wirelessly broadcasts a System Information Block ("SIB") containing information about the wireless access node 111, and the wireless access node 112 periodically wirelessly broadcasts a SIB containing information about the wireless access node 112. The network circuitry 103 may exchange data from the SIB with the user circuitry 102, and the user circuitry 102 may save the information from the SIB in memory.

In UE 101, user circuitry 102 executes the augmented reality application. Upon launching an application, the UE 101 initiates the Radio Resource Control ("RRC") connection setup procedure. During previous wireless communications with the wireless access node 111, the UE 101 may have been provided with allowed network slice information to which the UE 101 SIM profile 1 has access. A network slice is identified by its Single Network Slice Selection Assistance Information ("S-NSSAI"), which is a concatenation of a slice service type (8 bits) and a slice differentiator (24 bits). The slice differentiator is optional and used to differentiate between network slices having the same slice service type value. A set of one or more S-NSSAI are an NSSAI. The user circuitry 102 identifies the slice service type, the SIM profile, or an operating frequency band based on an association with the augmented reality application. In this example, for instance, the slice service type may be URLLC. The user circuitry 102 transmits a service request to the network circuitry 103 requesting wireless data service having the slice service type URLLC. In response, the network circuitry 103 identifies wireless access node 111 on which UE 101 is camped using SIM profile 1. The network circuitry 103 transmits an RRC request that includes a requested NSSAI, typically generated from the already known allowed NSSAI or from previously configured NSSAI, and which includes the desired URLLC to wireless access node 111. Wireless access node 111 transmits the request to the wireless network core 120. The wireless network core 120 responds with the NSSAI that the wireless UE 101 are allowed to use. In this example, the wireless network core 120 allows the requested NSSAI. The wireless access node 111 transmits the allowed NSSAI information to the UE 101 wirelessly. Other wireless communications may be exchanged between UE 101, wireless access node 111, and wireless network core 120 that are not included here for clarity.

Upon receipt of the RRC registration acceptance, the network circuitry 103 initiates an RRC PDU request to the wireless access node 111 that includes the S-NSSAI of network slice 121 that is specific to the slice service type identified by the user circuitry for the augmented reality application. The request also includes the Data Network Name ("DNN") and may include other parameters not depicted here. The wireless access node 111 transmits the request to the wireless network core 120 and receives an acceptance from the wireless network core 120 that initiates the PDU. The wireless access node 111 transmits the acceptance to the network circuitry 103. The network circuitry 103 wirelessly exchanges data with the wireless access node 111 over the selected OFB to provide the wireless service to the augmented reality application using network slice 121, and the network circuitry 103 exchanges data with user circuitry 102 to provide and request information for operating the augmented reality application.

Additionally, in UE 101, user circuitry 102 executes the social media application. Upon launching an application associated with the SIM profile 2, the UE 101 initiates the Radio Resource Control ("RRC") connection setup procedure. During previous wireless communications with the wireless access node 112, the UE 101 may have been provided with allowed network slice information to which the UE 101 SIM profile 2 has access. The user circuitry 102 identifies the slice service type, the SIM profile, or an operating frequency band based on an association with the social media application. In this example, for instance, the slice service type may be eMBB. The user circuitry 102 transmits a service request to the network circuitry 103 requesting wireless data service having the slice service type eMBB. In response, the network circuitry 103 identifies wireless access node 112 on which UE 101 is camped using SIM profile 2. The network circuitry 103 transmits an RRC request that includes a requested NSSAI, typically generated from the already known allowed NSSAI or from previously configured NSSAI, and which includes the desired eMBB to wireless access node 112. Wireless access node 112 transmits the request to the wireless network core 120. The wireless network core 120 responds with the NSSAI that the wireless UE 101 are allowed to use. In this example, the wireless network core 120 allows the requested NSSAI. The wireless access node 112 transmits the allowed NSSAI information to the UE 101 wirelessly. Other wireless communications may be exchanged between UE 101, wireless access node 112, and wireless network core 120 that are not included here for clarity.

Upon receipt of the RRC registration acceptance, the network circuitry 103 initiates an RRC PDU request to the wireless access node 112 that includes the S-NSSAI of network slice 122 that is specific to the slice service type identified by the user circuitry for the social media application. The request also includes the Data Network Name ("DNN") and may include other parameters not depicted here. The wireless access node 112 transmits the request to the wireless network core 120 and receives an acceptance from the wireless network core 120 that initiates the PDU. The wireless access node 112 transmits the acceptance to the network circuitry 103. The network circuitry 103 wirelessly exchanges data with the wireless access node 112 over the selected OFB to provide the wireless service to the social media application using network slice 122, and the network circuitry 103 exchanges data with user circuitry 102 to provide and request information for operating the social media application while the augmented reality application continues to execute and the network circuitry 103 wirelessly exchanges data with the wireless access node 111 to provide the wireless service to the augmented reality application using network slice 121 and the network circuitry 103 exchanges data with the user circuitry 102 to provide and request information for operating the augmented reality application.

Figure 5:
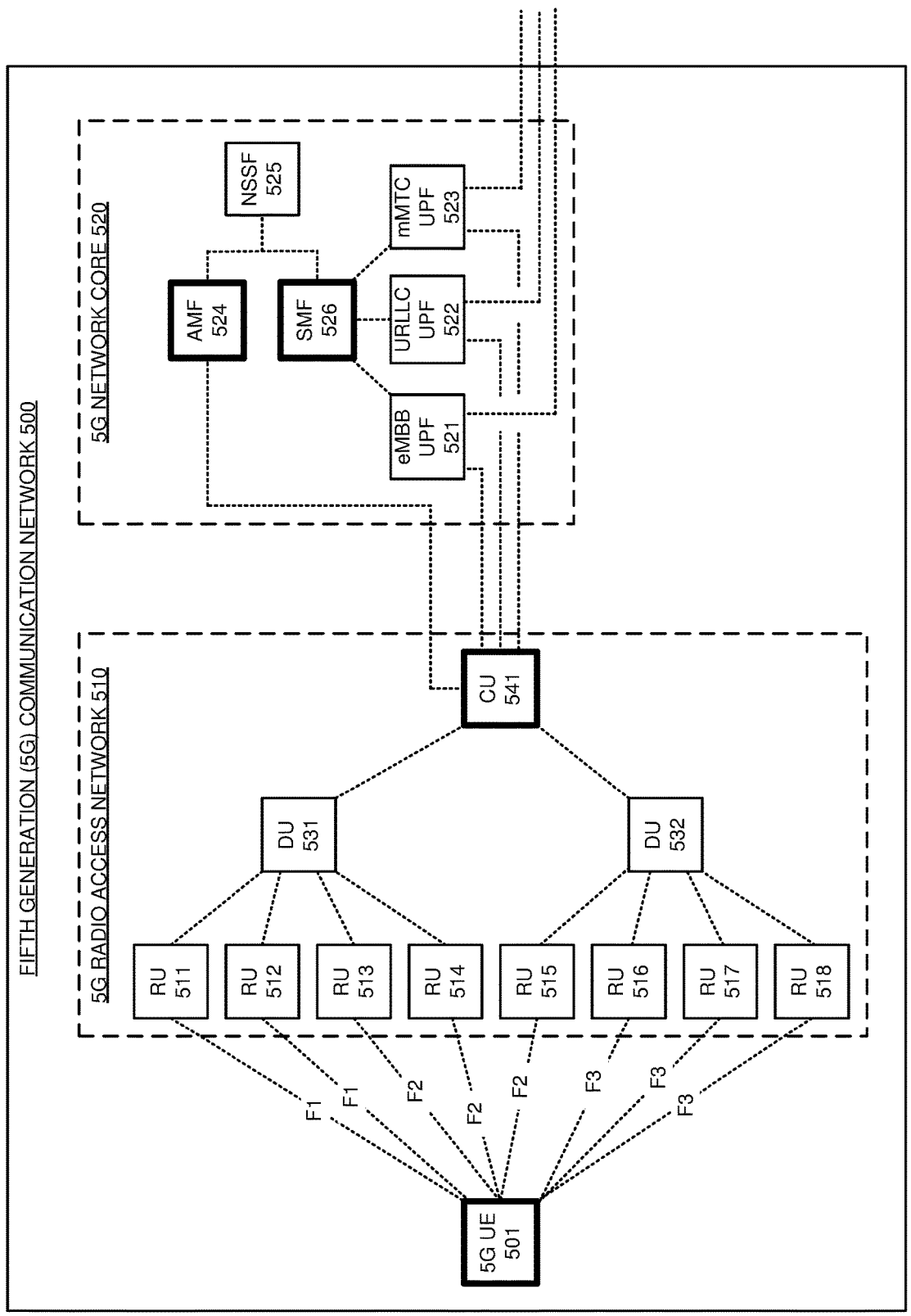
FIG. 5 illustrates a Fifth Generation (5G) communication network that serves a 5G User Equipment (UE) that activates and utilizes multiple SIM profiles.

FIG. 5 illustrates Fifth Generation (5G) communication network 500 that serves 5G User Equipment (UE) 501 that utilizes multiple active SIM profiles simultaneously. 5G communication network 500 comprises an example of wireless communication network 100, although network 100 may differ. 5G communication network 500 comprises 5G UE 501, 5G Radio Access Network (RAN) 510, and 5G network core 520. 5G RAN 510 comprises Radio Units (RUs) 511-518, Distributed Units 531 and 532, and Centralized Unit (CU) 541. 5G network core 520 comprises eMBB User Plane Function (UPF) 521, URLLC UPF 522, mMTC UPF 523, Access and Mobility Management Function (AMF) 524, Network Slice Selection Function (NSSF) 525, and Session Management Function (SMF) 526. Other network functions are typically present but are omitted for clarity. RUs 511 and 512 use a first frequency band (F1) that is a few thousand megahertz wide. RUs 513-515 use a second frequency band (F2) that is several hundred megahertz wide. RUs 516-518 use a third frequency band (F3) that is a few hundred megahertz wide.

Based on signal strength, UE 501 using SIM profile 1 wirelessly attaches to RU 511 over F1 and exchanges attachment signaling with CU 541 over RU 511 and DU 531. UE 501 sends requests for frequency bands F1-F3 and for eMBB, URLLC, and mMTC slices to AMF 524 over RU 511, DU 531, and CU 541. AMF 524 authorizes bands F1-F3 for UE 501 responsive to the UE request in the RRC exchange described in FIG. 4. AMF 524 interacts with NSSF 525 to authorize UE 501 for the eMBB, URLLC, and mMTC slices responsive to the request in the RRC exchange described in FIG. 4. AMF 524 indicates authorized F1-F3 bands and authorized eMBB, URLLC, and mMTC slices to UE 501 over CU 541, DU 531, and RU 511.

UE 501 executes an augmented reality application, identifies the URLLC slice service type based on the application based on an association in the augmented reality application. UE 501 selects the authorized URLLC slice based on the association with the augmented reality application. UE 501 attaches to CU 541 over RU 511 and DU 531. Over RU 511, DU 531, and CU 541, UE 501 instructs SMF 526 to activate the authorized URLLC slice in response to the PDU establishment request as described with respect to FIG. 4. In response, SMF 526 selects URLLC bearer QoS and addressing for UE 501. SMF 526 selects and controls URLLC UPF 522 to serve the URLLC bearer to CU 541 per the QoS and addressing. AMF 524 controls CU 541 to serve the URLLC bearer between UE 501 and URLLC UPF 522 over F1, RU 511, and DU 531. CU 541 signals DU 531 and RU 511 to deliver the URLLC bearer over F1 per the URLLC QoS and addressing. CU 541 signals UE 501 over DU 531 and RU 511 to use the URLLC bearer over F1 for the URLLC slice. UE 501 and URLLC UPF 522 now exchange user data over F1, RU 511, DU 531, and CU 541.

Based on signal strength, UE 501 using SIM profile 2 wirelessly attaches to RU 513 over F2 and exchanges attachment signaling with CU 541 over RU 513 and DU 531. UE 501 sends requests for frequency bands F1-F3 and for eMBB, URLLC, and mMTC slices to AMF 524 over RU 513, DU 531, and CU 541. AMF 524 authorizes bands F1-F3 for UE 501 using SIM profile 2 responsive to the UE request in the RRC exchange described in FIG. 4. AMF 524 interacts with NSSF 525 to authorize UE 501 for the eMBB, URLLC, and mMTC slices responsive to the request in the RRC exchange described in FIG. 4. AMF 524 indicates authorized F1-F3 bands and authorized eMBB, URLLC, and mMTC slices to UE 501 over CU 541, DU 531, and RU 513.

UE 501 executes a social media application, identifies the eMBB slice service type based on an association in the social media application. UE 501 selects the authorized eMBB slice based on the association with the social media application. UE 501 attaches to CU 541 over RU 513 and DU 531. Over RU 513, DU 531, and CU 541, UE 501 instructs SMF 526 to activate the authorized eMBB slice in response to the PDU establishment request as described with respect to FIG. 4. In response, SMF 526 selects eMBB bearer QoS and addressing for UE 501. SMF 526 selects and controls eMBB UPF 521 to serve the eMBB bearer to CU 541 per the QoS and addressing. AMF 524 controls CU 541 to serve the eMBB bearer between UE 501 and eMBB UPF 521 over F2, RU 513, and DU 531. CU 541 signals DU 531 and RU 513 to deliver the eMBB bearer over F2 per the eMBB QoS and addressing. CU 541 signals UE 501 over DU 531 and RU 513 to use the eMBB bearer over F2 for the eMBB slice. UE 501 and eMBB UPF 521 now exchange user data over F2, RU 513, DU 531, and CU 541.

As UE 501 moves about, UE 501 and CU 541 may perform handovers for the URLLC slice over F1 from RU 511 to RU 512 (or another RU or band). While the handover may not be required at the same time, handovers for the eMBB slice over F2 may be performed from RU 513 to RU 514-515. UE 501 and CU 541 may perform handovers for the mMTC slices over F3 from RU 516 to RUs 517-518 (or another RU or band) if needed. For each SIM profile, the handovers ideally remain on the same OFB as originated as preferred, and/or are handed to a cell operating at the preferred OFB if not available when the PDU was established. For example, prior to a handover, the network circuitry 103 may exchange information with the user circuitry 102, and user circuitry 102 may identify a preferred OFB for the network circuitry 103 to measure prior to a handover. If the measurement reveals a target cell is suitable over the preferred OFB, the handover may be to the target cell.

As UE 501 moves around, the QoS for RU 511 may fall below a threshold. UE 501 measures the F1 signal (e.g., SINR, RSRP or any other appropriate measurement), of RU 512 and transfers a cell reselection request to F1 on RU 512. CU 541 selects RU 512 based on the best F1 signal. CU 541 directs UE 501 using SIM profile 1 to attach to RU 512 over F1 and controls RU 512 and DU 531 to serve UE 501 using SIM profile 1 over F1. CU 541 notifies AMF 524 of the cell reselection to F1 and RU 512. UE 501 attaches to CU 541 over RU 512 and DU 531. Over RU 512, DU 531, and CU 541, UE 501 instructs SMF 526 to activate the authorized URLLC slice in response to the PDU establishment request as described with respect to FIG. 4. In response, SMF 526 selects URLLC bearer QoS and addressing for UE 501. SMF 526 selects and controls URLLC UPF 522 to serve the URLLC bearer to CU 541 per the QoS and addressing. AMF 524 controls CU 541 to serve the URLLC bearer between UE 501 and URLLC UPF 522 over F1, RU 512, and DU 531 using handovers. CU 541 signals DU 531 and RU 512 to deliver the URLLC bearer over F1 per the URLLC QoS and addressing. CU 541 signals UE 501 over DU 531 and RU 512 to use the URLLC bearer over F1 and to use handovers for the URLLC slice. UE 501 and URLLC UPF 522 now exchange user data over F1, RU 512, DU 531, and CU 541.

Figure 6:
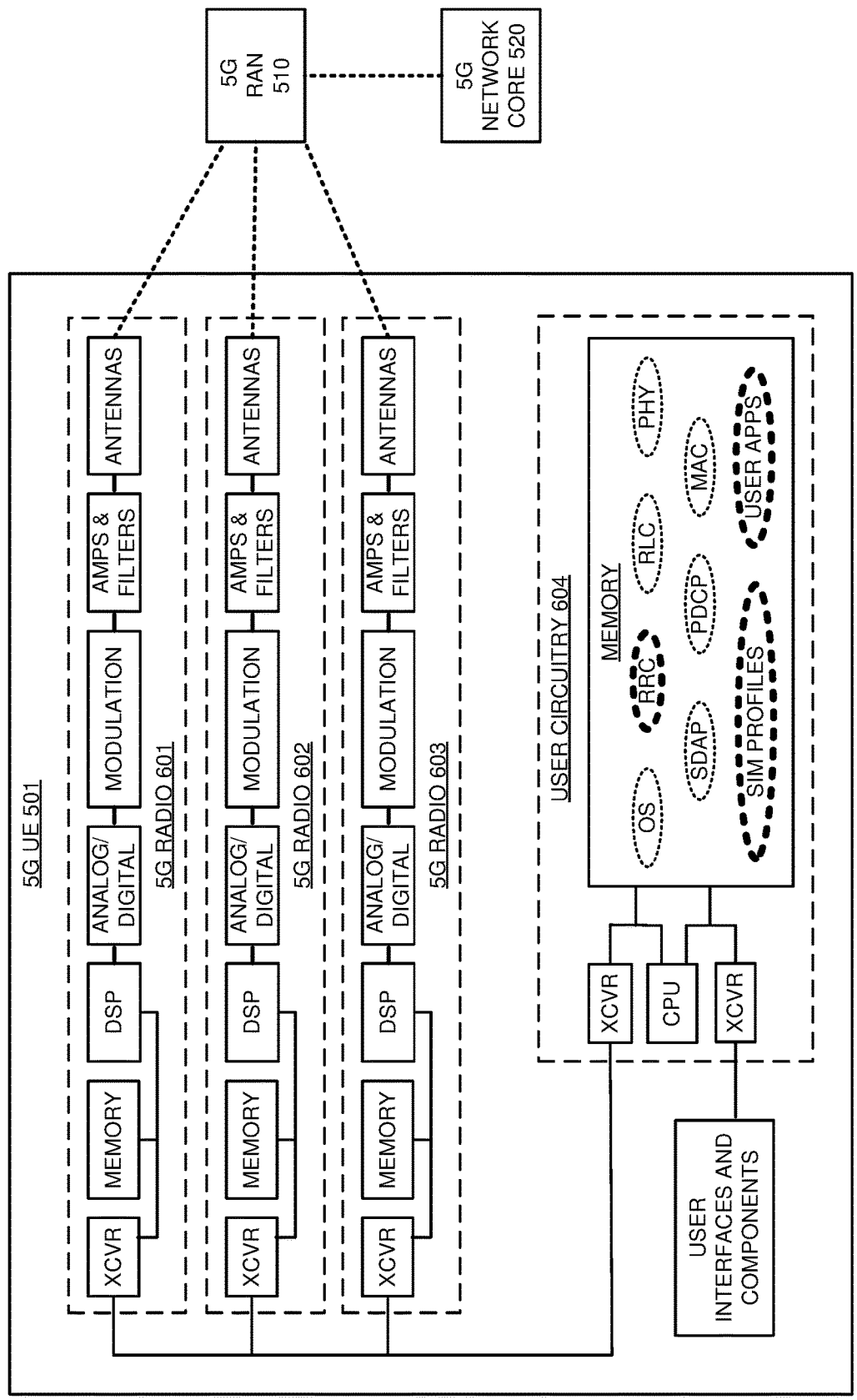
FIG. 6 illustrates the 5G UE that activates and utilizes multiple SIM profiles.

FIG. 6 illustrates 5G UE 501 that activates and utilizes multiple SIM profiles simultaneously. UE 501 comprises an example of UE 101, although UE 101 may differ. UE 501 comprises 5GNR radios 601-603 and user circuitry 604. 5GNR radios 601-603 comprise antennas, amplifiers, filters, modulation, analog-to-digital interfaces, DSP, memory, and transceivers that are coupled over bus circuitry. User circuitry 604 comprises memory, CPU, user interfaces and components, and transceivers that are coupled over bus circuitry. The memory in user circuitry 604 stores an operating system, user applications (USER APPS), the SIM PROFILES, and 5GNR network applications for PHY, MAC, RLC, PDCP, SDAP, and RRC. The antennas in 5GNR radios 601-603 are wirelessly coupled to 5G RAN 510 over OFBs F1-F3. Transceivers in 5GNR radios 601-603 are coupled to a transceiver in user circuitry 604. A transceiver in user circuitry 604 is typically coupled to the user interfaces and components like displays, controllers, and memory. The CPU in user circuitry 604 executes the operating system, PHY, MAC, RLC, PDCP, SDAP, and RRC to exchange 5GNR signaling and data with 5G RAN 510 over 5GNR radios 601-603.

In 5GNR radios 601-603, the antennas receive wireless signals from 5G RAN 510 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency (F1-F3). The analog/digital interfaces convert the demodulated analog signals into digital signals for the DSPs. The DSPs transfer corresponding 5GNR symbols to user circuitry 604 over the transceivers. In user circuitry 604, the CPU executes the network applications to process the 5GNR symbols and recover the downlink 5GNR signaling and data. The 5GNR network applications receive new uplink signaling and data from the user applications. The network applications process the uplink user signaling, the downlink 5GNR signaling to generate new downlink user signaling, and new uplink 5GNR signaling. The network applications transfer the new downlink user signaling and data to the low-latency user applications. The 5GNR network applications process the new uplink 5GNR signaling and low-latency user data to generate corresponding uplink 5GNR symbols that carry the uplink 5GNR signaling and data. In 5GNR radios 601-603, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency (F1-F3). The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 510 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Based on signal strength detected by radio 601, the RRC in UE 501 wirelessly attaches to RU 513 in RAN 510 over OFB F2 and exchanges attachment signaling with CU 541 for SIM profile 3. The RRC in UE 501 requests OFBs F1-F3 and eMBB, URLLC, and mMTC slices to AMF 524 in network core 520 over 5G RAN 510. AMF 524 indicates authorized F1-F3 bands and authorized eMBB, URLLC, and mMTC slices to the RRC in UE 501 over 5G RAN 510.

UE 501 executes a video-conferencing application and selects the corresponding and authorized eMBB slice service type. UE 501 identifies a preferred OFB F2, slice service type eMBB, and or SIM profile 3 based on associations in the video-conferencing application. In response to selecting the eMBB slice and identifying F2 as the preferred OFB, UE 501 measures the F2 signal (e.g., SINR, RSRP, or any other appropriate measurement), of RUs 513-515 and transfers a cell reselection request to F2 based on the measurement being suitable. For example, 5G radio 602 and the F2 PHY measure the response of RUs 513-515 in 5G RAN 510. The RRC transfers a cell addition request for F2 and an F2 report to CU 541. CU 541 selects RU 515 based on the best F2 signal and directs the RRC in UE 501 to attach to RU 515 over F2. UE 501 attaches to RU 515 over F2. The RRC in UE 501 instructs SMF 526 to activate the authorized eMBB slice. CU 541 signals the RRC in UE 501 to use the eMBB bearer over F2. The SDAP in UE 501 and eMBB UPF 521 now exchange eMBB user data over radio 602, F2, RU 515, DU 532, and CU 541 to support the video-conferencing application. Simultaneously, UE 501 may execute an augmented-reality application and the SDAP in UE 501 and URLLC UPF 522 may exchange URLLC user data over radio 601, F1, RU 511, DU 531, and CU 541 to support the augmented-reality application.

As UE 501 moves about, the RRC in UE 501 and CU 541 may perform handovers for the eMBB slice over F2 from RU 515 to RUs 513 or 514 (or another RU or band). Handovers ideally remain on the same OFB as originated as preferred, and/or are handed to a cell operating at the preferred OFB if not available when the PDU was established. For example, prior to a handover, the network circuitry 103 may exchange information with the user circuitry 102, and user circuitry 102 may identify the preferred OFB, slice service type, and/or SIM profile. The user circuitry may use this information to provide to the network circuitry 103 to measure an appropriate OFB prior to a handover. If the measurement reveals a target cell is suitable over the preferred OFB, the handover may be to the target cell.

The wireless data network circuitry described above comprises computer hardware and software that form special-purpose UE circuitry to use specific handover types for specific wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically embedded machine-level software that drives the compilation and execution of the other computer software components which then assert control. Due to this automated execution, the presence of the higher-level software in memory physically changes the structure of the computer hardware machines into special-purpose UE circuitry to use specific handover types for specific wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to utilize multiple subscriber identity module (SIM) profiles, the method comprising:
   user circuitry activating two or more SIM profiles to be active simultaneously;
   the user circuitry transferring a first service request for a first wireless data service using a first SIM profile of the two or more SIM profiles to network circuitry, the first wireless data service having a first slice service type over a first operating frequency band of a first target cell;
   the user circuitry transferring a second service request for a second wireless data service using a second SIM profile of the two or more SIM profiles to the network circuitry, the second wireless data service having a second slice service type over a second operating frequency band of a second target cell wherein the first operating frequency band is selected based on the first slice service type and the second operating frequency band is selected based on the second slice service type;
   the network circuitry wirelessly exchanging data with a first wireless access node associated with the first target cell over the first operating frequency band to establish a first packet data unit session comprising the first slice service type using the first SIM profile; and
   the network circuitry wirelessly exchanging data with a second wireless access node associated with the second target cell over the second operating frequency band to establish a second packet data unit session comprising the second slice service type using the second SIM profile while the first packet data unit session remains active using the first SIM profile.

2. The method of claim 1, further comprising:
   the user circuitry launching a first application and mapping the first application to use the first packet data unit session based on an association between the first application and the first slice service type;
   the user circuitry launching a second application and mapping the second application to use the second packet data unit session based on an association between the second application and the second slice service type; and
   the network circuitry exchanging data of the first application with the first wireless access node and exchanging data of the second application with the second wireless access node.

3. The method of claim 1, further comprising:
   the user circuitry launching a first application and mapping the first application to use the first packet data unit session based on an association between the first application and the first operating frequency band;
   the user circuitry launching a second application and mapping the second application to use the second packet data unit session based on an association between the second application and the second operating frequency band; and
   the network circuitry exchanging data of the first application with the first wireless access node and exchanging data of the second application with the second wireless access node.

4. The method of claim 1, further comprising:
   the user circuitry launching a first application and mapping the first application to use the first packet data unit session;
   the user circuitry transferring a third service request for a third wireless data service using a third SIM profile of the two or more SIM profiles to the network circuitry, the third wireless data service having the first slice service type over a third operating frequency band of a third target cell;
   the network circuitry wirelessly exchanging data with a third wireless access node associated with the third target cell over the third operating frequency band to establish a third packet data unit session comprising the first slice service type using the third SIM profile;
   the user circuitry handing over the first application from the first SIM profile to the third SIM profile; and
   the network circuitry wirelessly exchanging data of the first application with the third wireless access node.

5. The method of claim 4, wherein the user circuitry handing over the first application from the first SIM profile to the third SIM profile is in response to at least one of data latency, data reliability, or data throughput falling below a threshold on the first target cell.

6. The method of claim 4, wherein the user circuitry handing over the first application from the first SIM profile to the third SIM profile is in response to a change in the mobility of the wireless UE.

7. The method of claim 1, further comprising:
   the network circuitry completing a cell reselection from the first target cell to a third target cell using the first SIM profile, wherein the second packet data unit session using the second SIM profile remains on the second target cell.

8. The method of claim 7, wherein the cell reselection is completed in response to at least one of a change in the mobility of the wireless UE, data latency falling below a threshold on the first target cell, data reliability falling below a threshold on the first target cell, or data throughput falling below a threshold on the first target cell.

9. The method of claim 1, wherein the first operating frequency band comprises a first bandwidth and the second operating frequency comprises a second bandwidth.

10. The method of claim 1, wherein the first slice service type comprises one of enhanced Mobile Broadband (eMBB), Ultra Reliable Low Latency Communications (URLLC), or massive Machine Type Communications (mMTC) and the second slice service type comprises a different one of eMBB, URLLC, or mMTC.

11. A wireless User Equipment (UE) to utilize multiple subscriber identify module (SIM) profiles, the wireless UE comprising:
   user circuitry configured to activate two or more SIM profiles to be active simultaneously;
   the user circuitry configured to transfer a first service request for a first wireless data service using a first SIM profile of the two or more SIM profiles to network circuitry, the first wireless data service having a first slice service type over a first operating frequency band of a first target cell;
   the user circuitry configured to transfer a second service request for a second wireless data service using a second SIM profile of the two or more SIM profiles to the network circuitry, the second wireless data service having a second slice service type over a second operating frequency band of a second target cell wherein the first operating frequency band is selected based on the first slice service type and the second operating frequency band is selected based on the second slice service type;
   the network circuitry configured to wirelessly exchange data with a first wireless access node associated with the first target cell over the first operating frequency band to establish a first packet data unit session comprising the first slice service type using the first SIM profile; and
   the network circuitry configured to wirelessly exchange data with a second wireless access node associated with the second target cell over the second operating frequency band to establish a second packet data unit session comprising the second slice service type using the second SIM profile while the first packet data unit session remains active using the first SIM profile.

12. The wireless UE of claim 11, wherein:
   the user circuitry is configured to launch a first application and mapping the first application to use the first packet data unit session based on an association between the first application and the first slice service type;
   the user circuitry is configured to launch a second application and mapping the second application to use the second packet data unit session based on an association between the second application and the second slice service type; and
   the network circuitry is configured to exchange data of the first application with the first wireless access node and exchanging data of the second application with the second wireless access node.

13. The wireless UE of claim 11, wherein:
   the user circuitry is configured to launch a first application and mapping the first application to use the first packet data unit session based on an association between the first application and the first operating frequency band;
   the user circuitry is configured to launch a second application and mapping the second application to use the second packet data unit session based on an association between the second application and the second operating frequency band; and
   the network circuitry is configured to exchange data of the first application with the first wireless access node and exchanging data of the second application with the second wireless access node.

14. The wireless UE of claim 11, wherein:
   the user circuitry is configured to launch a first application and mapping the first application to use the first packet data unit session;
   the user circuitry is configured to transfer a third service request for a third wireless data service using a third SIM profile of the two or more SIM profiles to the network circuitry, the third wireless data service having the first slice service type over a third operating frequency band of a third target cell;
   the network circuitry is configured to wirelessly exchange data with a third wireless access node associated with the third target cell over the third operating frequency band to establish a third packet data unit session comprising the first slice service type using the third SIM profile;
   the user circuitry is configured to hand over the first application from the first SIM profile to the third SIM profile; and
   the network circuitry is configured to wirelessly exchange data of the first application with the third wireless access node.

15. The wireless UE of claim 14, wherein the user circuitry handing over the first application from the first SIM profile to the third SIM profile is in response to at least one of data latency, data reliability, or data throughput falling below a threshold on the first target cell.

16. The wireless UE of claim 14, wherein the user circuitry handing over the first application from the first SIM profile to the third SIM profile is in response to a change in the mobility of the wireless UE.

17. The wireless UE of claim 11, wherein:
   the network circuitry is configured to complete a cell reselection from the first target cell to a third target cell using the first SIM profile, wherein the second packet data unit session using the second SIM profile remains on the second target cell.

18. The wireless UE of claim 17, wherein the cell reselection is completed in response to at least one of a change in the mobility of the wireless UE, data latency falling below a threshold on the first target cell, data reliability falling below a threshold on the first target cell, or data throughput falling below a threshold on the first target cell.

19. The wireless UE of claim 11, wherein the first operating frequency band comprises a first bandwidth and the second operating frequency band comprises a second bandwidth.

20. The wireless UE of claim 11, wherein the first slice service type comprises one of enhanced Mobile Broadband (eMBB), Ultra Reliable Low Latency Communications (URLLC), or massive Machine Type Communications (mMTC) and the second slice service type comprises a different one of eMBB, URLLC, or mMTC.

* * * * *